United States Patent
Takeda et al.

(10) Patent No.: US 8,478,095 B2
(45) Date of Patent: Jul. 2, 2013

(54) OPTICAL FIBER CABLE FOR WIRING IN PREMISES

(75) Inventors: Daiki Takeda, Sakura (JP); Naoki Okada, Sakura (JP); Satoru Shiobara, Sakura (JP); Tadayoshi Sayama, Sakura (JP); Shimei Tanaka, Sakura (JP); Katsuyoshi Endoh, Sakura (JP); Keiichiro Sugimoto, Tsukuba (JP); Shinichi Niwa, Tsukuba (JP)

(73) Assignees: Fujikura Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 78 days.

(21) Appl. No.: 13/109,543

(22) Filed: May 17, 2011

(65) Prior Publication Data
US 2011/0262085 A1    Oct. 27, 2011

Related U.S. Application Data

(63) Continuation of application No. PCT/JP2009/006200, filed on Nov. 18, 2009.

(30) Foreign Application Priority Data

Nov. 18, 2008 (JP) ................. 2008-294665

(51) Int. Cl.
*G02B 6/44* (2006.01)
(52) U.S. Cl.
USPC ........... 385/100; 385/109; 385/113; 385/128; 524/140
(58) Field of Classification Search
USPC ............ 385/100–114, 128; 524/140
See application file for complete search history.

(56) References Cited

U.S. PATENT DOCUMENTS

| | | | |
|---|---|---|---|
| 4,642,265 A * | 2/1987 | Suzuki ........................ | 428/375 |
| 5,206,926 A | 4/1993 | Yamamoto et al. | |
| 5,444,809 A * | 8/1995 | Aoki et al. ................... | 385/128 |
| 5,707,732 A * | 1/1998 | Sonoda et al. ............... | 428/357 |
| 6,501,887 B1 * | 12/2002 | Bringuier et al. ............ | 385/109 |
| 7,813,606 B2 * | 10/2010 | Yasutomi et al. ............ | 385/113 |
| 2006/0088263 A1 * | 4/2006 | Tanaka et al. ................ | 385/128 |

FOREIGN PATENT DOCUMENTS

| | | |
|---|---|---|
| JP | 2-257105 A | 10/1990 |
| JP | 3-17606 A | 1/1991 |
| JP | 4-248506 A | 9/1992 |
| JP | 9-230185 A | 9/1997 |

(Continued)

OTHER PUBLICATIONS

Notice of Reasons for Rejection dated May 24, 2011 from the Japanese Patent Office in counterpart Japanese application No. 2009-261697.

(Continued)

*Primary Examiner* — Daniel Petkovsek
(74) *Attorney, Agent, or Firm* — Sughrue Mion, PLLC

(57) ABSTRACT

This optical fiber cable is provided with a covering resin including an outermost layer. The outermost layer is formed by a resin composition including: (a) a base resin prepared by adding at least one copolymer selected from an ethylene-vinyl acetate copolymer and an ethylene-ethyl acrylate copolymer to a high density polyethylene; (b) 25 to 90 parts by weight of a phosphate salt with respect to 100 parts by weight of the base resin; and (c) 0.75 to 15 parts by weight of either a silicone dispersed polyethylene or a silicone grafted polyethylene with respect to 100 parts by weight of the base resin.

8 Claims, 2 Drawing Sheets

FOREIGN PATENT DOCUMENTS

| | | |
|---|---|---|
| JP | 2001-6446 A | 1/2001 |
| JP | 2002-267897 A | 9/2002 |
| JP | 2002-313153 A | 10/2002 |
| JP | 2002-357749 A | 12/2002 |
| JP | 2003-295010 A | 10/2003 |
| JP | 2003-337266 A | 11/2003 |
| JP | 2004-219815 A | 8/2004 |
| JP | 2005-48168 A | 2/2005 |
| JP | 2005-239997 A | 9/2005 |
| JP | 3915016 B2 | 5/2007 |
| JP | 3970499 B2 | 9/2007 |
| JP | 2008-63458 A | 3/2008 |
| JP | 2008-94922 A | 4/2008 |
| TW | 200611917 | 4/2006 |

OTHER PUBLICATIONS

Office Action dated Mar. 27, 2013, issued in Taiwanese Patent Application No. 98138974.

* cited by examiner

OPTICAL FIBER CABLE FOR WIRING IN PREMISES

CROSS REFERENCE TO RELATED APPLICATIONS

This application is a continuation application based on a PCT Patent Application No. PCT/JP2009/006200, filed Nov. 18, 2009, whose priority is claimed on Japanese Patent Application No. 2008-294665 filed Nov. 18, 2008, the entire content of which are hereby incorporated by reference.

BACKGROUND OF THE INVENTION

1. Field of the Invention

The present invention relates to an optical fiber cable which can be used for fiber to the home (FTTH) services and the like, in which optical fibers are extended to individual homes, and also relates to a resin composition that is used therefor.

Priority is claimed on Japanese Patent Application No. 2008-294665, filed Nov. 18, 2008, the content of which is incorporated herein by reference.

2. Description of the Related Art

FIG. 1 and FIG. 2 are diagrams showing examples of an optical fiber cable used in the FTTH services and the like.

FIG. 1 shows an optical fiber cable used for introducing an optical line to a subscriber's home. This optical fiber cable 10 has a self supporting structure in which a support wire portion 1 and a cable body portion 2 are connected via a neck portion 3.

An optical fiber cable 20 shown in FIG. 2 is used, for example, for the wiring in subscribers' homes and in premises such as buildings and apartments, and it does not include the support wire portion 1 and is formed solely of the cable body portion 2.

In the optical fiber cables 10 and 20, a halogen-free, flame retardant polyolefin or the like is used for a covering resin 6.

Various proposals have been made regarding the materials constituting an outer covering of an optical fiber cable (for example, refer to Patent Documents 1 to 5).

In Patent Document 1 (Japanese Patent Publication No. 3915016) and Patent Document 2 (Japanese Patent Publication No. 3970499), use of a material containing a fatty acid amide has been disclosed.

In Patent Document 3 (Japanese Unexamined Patent Application, First Publication No. 2002-313153), a material in which a silicone dispersed polyethylene, a fluororesin dispersed polyethylene and a silicone grafted polyethylene are added has been disclosed.

In Patent Document 4 (Japanese Unexamined Patent Application, First Publication No. 2008-94922) and Patent Document 5 (Japanese Unexamined Patent Application, First Publication No. 2008-63458), use of a polyolefin-based resin and a phosphate salt has been disclosed.

In many cases, the optical fiber cable used in subscribers' homes and in premises such as buildings and apartments is extended through a tubing for electric wires, such as a flexible tube made of a synthetic resin.

However, the existing tubing for electric wires already accommodates a plurality of metal wires, such as a telephone line, that extend therein, and thus there is only a small empty space left for the optical fiber cable which is to be additionally laid.

For this reason, there have been demands for reduction of the cable diameter and improvements in the line receiving properties.

However, when the diameter of a cable is reduced, the mass of resin per unit area reduces, and thus a highly flame retardant resin has to be used as a cable covering material. In addition, in order to improve the line receiving properties, the lowering of the friction properties of outer coverings as well as the abrasion resistance thereof against other cables (such as the existing telephone lines) or cable receiving rods become important factors.

As disclosed in Patent Documents 1 and 2, for lowering the friction properties of outer covering materials, it is effective to add a fatty acid amide to the outer covering materials. Fatty acid amides such as stearamide, oleamide and erucamide have low molecular weights, and thus easily bleed out on the surface of outer coverings, thereby making the surface of outer coverings slimy and reducing the coefficient of friction thereof.

However, the low molecular weight fraction that bled out on the surface is readily removed by the rubbing of outer coverings or the like, thereby increasing the coefficient of friction at times. Moreover, the fatty acid amides enter inside the covering UV-curable resin of an optical fiber and adversely affect the glass optical fiber, which may deteriorate the transmission characteristics.

From the above viewpoints, as a method for lowering the friction properties, it is desirable to adopt a non-bleeding system, as disclosed in Patent Document 3, in which a silicone dispersed polyethylene is blended.

Further, in addition to the use of a lubricant component as described above, it is also effective to use a resin that originally has a low coefficient of friction, such as a high density polyethylene, for a base resin. However, a highly crystalline resin such as a high density polyethylene has low filler acceptability, and thus a flame retardant cannot be added in large amounts, making it difficult to achieve a target level of flame resistance.

On the other hand, the optical fiber cable used in subscribers' homes and in premises such as buildings and apartments is not only extended through a tubing for electric wires, but also may be disposed in a cable rack or the like at times. Accordingly, from the viewpoint of preventing the spread of fire through the optical fiber cable, a flame resistance which satisfies the criteria set in an inclined combustion test specified in JIS C3005 or the like is required.

In addition, there is a demand for the use of a halogen-free optical fiber cable in consideration of the impacts on the environment and the safety of gas generated at the time of combustion. Conventionally, in order to satisfy the criteria set in the inclined combustion test using a halogen-free resin, it was necessary to add a large amount of magnesium hydroxide, aluminum hydroxide or the like as a flame retardant.

It has been technically difficult to add these flame retardants to a highly crystalline resin, such as a low density polyethylene (LDPE), a linear low density polyethylene (LLDPE) and a high density polyethylene (HDPE), in large amounts, and in order to develop the flame resistance, magnesium hydroxide, aluminum hydroxide or the like has to be added while using an amorphous resin, such as an ethylene-vinyl acetate copolymer (EVA) and an ethylene-ethyl acrylate copolymer (EEA), as a base polymer.

However, the resin prepared by adding a large amount of magnesium hydroxide, aluminum hydroxide or the like to an ethylene-vinyl acetate copolymer (EVA), an ethylene-ethyl acrylate copolymer (EEA) or the like has a high coefficient of friction, as compared to a low friction polyethylene, a linear, low friction polyethylene and a high density polyethylene, and also, a satisfactory level of low frictional properties cannot be attained even when a silicone dispersed polyethylene or the like is added thereto.

Moreover, as disclosed in Patent Document 4, when the amount of filler added increases, the abrasion resistance deteriorates, thereby making the resin to easily abraded out, or the cold resistance (embrittlement characteristics) of resin is impaired. In addition, it should be noted that in order to enhance the abrasion resistance, it is effective to use a high density polyethylene, which primarily has a favorable level of abrasion resistance, as a base resin. However, in this case, the filler acceptability reduces, and thus a required level of flame resistance cannot be ensured at times.

SUMMARY

The present invention is made in view of the above circumstances, and its object is to provide an optical fiber cable and a resin composition which exhibit excellent levels of flame resistance, abrasion resistance, friction properties and cold resistance.

In order to resolve the above-mentioned problems and to achieve the above-mentioned object, the present invention employs the followings.
(1) An optical fiber cable according to the present invention is provided with a covering resin including an outermost layer, wherein the outermost layer is formed by a resin composition including: (a) a base resin prepared by adding at least one copolymer selected from an ethylene-vinyl acetate copolymer and an ethylene-ethyl acrylate copolymer to a high density polyethylene; (b) 25 to 90 parts by weight of a phosphate salt with respect to 100 parts by weight of the base resin; and (c) 0.75 to 15 parts by weight of either a silicone dispersed polyethylene or a silicone grafted polyethylene with respect to 100 parts by weight of the base resin.
(2) In the optical fiber cable according to the above (1), a ratio of the high density polyethylene contained in 100 parts by weight of the base resin may be 30% by weight or more.
(3) In the optical fiber cable according to the above (2), it may be configured such that: the covering resin has a multi-layered structure that includes an outer layer formed by the resin composition, and an inner layer formed by a polyolefin-based resin; and the inner layer is formed by a resin including 100 parts by weight of a base resin that contains at least one copolymer selected from an ethylene vinyl acetate copolymer and an ethylene-ethyl acrylate copolymer, and 50 to 200 parts by weight of magnesium hydroxide.
(4) In the optical fiber cable according to the above (1), it may be configured such that: the covering resin has a multi-layered structure that includes an outer layer formed by the resin composition, and an inner layer formed by a polyolefin-based resin; and the inner layer is constituted of a resin including 100 parts by weight of a base resin that contains at least one copolymer selected from an ethylene vinyl acetate copolymer and an ethylene-ethyl acrylate copolymer, and 50 to 200 parts by weight of magnesium hydroxide.
(5) A resin composition of the present invention includes: (a) a base resin prepared by adding at least one copolymer selected from an ethylene-vinyl acetate copolymer and an ethylene-ethyl acrylate copolymer to a high density polyethylene; (b) 25 to 90 parts by weight of a phosphate salt with respect to 100 parts by weight of the base resin; and (c) 0.75 to 15 parts by weight of either a silicone dispersed polyethylene or a silicone grafted polyethylene with respect to 100 parts by weight of the base resin, wherein a ratio of the high density polyethylene within the base resin is 30% by weight or more.

According to the present invention, by using the above-mentioned resin composition, the levels of abrasion resistance, friction properties and cold resistance become favorable without reducing the level of flame resistance.

EMBODIMENTS FOR CARRYING OUT THE INVENTION

An embodiment according to the present invention will be described below using FIGS. 1 to 3.

Figure 1:
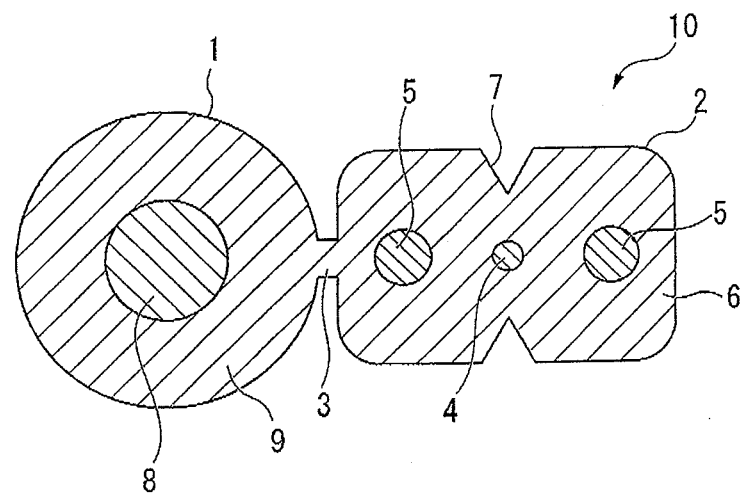
FIG. 1 is a cross sectional diagram showing an example of an optical fiber cable according to the present invention.

FIG. 1 is a cross sectional diagram showing an example of an optical fiber cable according to the present invention. This optical fiber cable 10 has a self supporting structure in which a support wire portion 1 and a cable body portion 2 are connected via a neck portion 3.

An optical fiber 4 and tensile-strength bodies 5 arranged at both sides thereof are collectively covered by a covering resin 6 to form the cable body portion 2.

The optical fiber 4 is embedded in the center of the cable body portion 2 in the cross section, and the optical fiber 4 can be exposed by dividing the covering resin 6 into two at two notches 7.

The optical fiber 4 may be an optical fiber core wire having a single core, an optical fiber tape core wire having multi-cores, an optical fiber wire, or the like. In addition, although only one optical fiber 4 is depicted in the drawings, the number thereof is not limited to these examples and a plurality of optical fibers may be used.

The tensile-strength body 5 is a striate body disposed along the optical fiber 4 so as to sustain a longitudinal stress, and the material thereof is, for example, a metallic wire, such as a steel wire, a fiber reinforced plastic (FRP) or the like.

The support wire portion 11 is formed of a tensile-strength body 8 covered with a covering resin 9. A metallic wire such as a steel wire is suitably used for the tensile-strength body 8. The covering resin 9 can be formed using the same material as that constituting the covering resin 6.

The neck portion 3 connecting the support wire portion 1 and the cable body portion 2 can be formed using the same resin as that constituting the covering resin 6 and the covering resin 9, and it is also possible to separate the support wire portion 1 and the cable body portion 2 by cutting the neck portion 3.

The covering resins 6 and 9 and the neck portion 3 can be integrally formed. These covering resins 6 and 9 and the neck portion 3 constitute the outermost layer of the optical fiber cable 10.

The optical fiber cable 10 can be used for introducing the optical lines to subscribers' homes.

Figure 2:
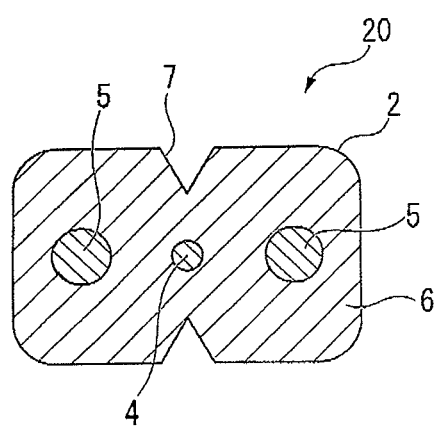
FIG. 2 is a cross sectional diagram showing another example of an optical fiber cable according to the present invention.

FIG. 2 is a cross sectional diagram showing another example of an optical fiber cable according to the present invention, and an optical fiber cable 20 shown here can be configured in the same manner as that for the optical fiber cable 10 shown in FIG. 1, except that the former does not include the support wire portion 1 and is formed solely of the cable body portion 2.

The optical fiber cable 20 can be used, for example, for the wiring in subscribers' homes and in premises such as buildings and apartments.

Figure 3:
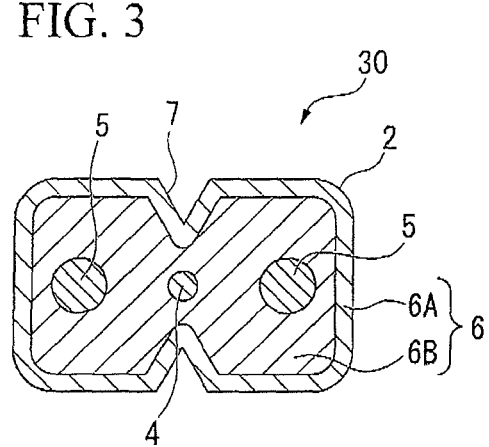
FIG. 3 is a cross sectional diagram showing yet another example of an optical fiber cable according to the present invention.

FIG. 3 is a cross sectional diagram showing yet another example of an optical fiber cable according to the present invention, and an optical fiber cable 30 shown here can be configured in the same manner as that for the optical fiber cable 20 shown in FIG. 2, except that the covering resin 6 of the cable body portion 2 is formed as a two-layer structure composed of an outer layer 6A and an inner layer 6B. Note that the covering resin 6 may also be formed as a structure having 3 or more layers.

The ratio of cross sectional area of the outer layer 6A and that of the inner layer 6B is, for example, within a range from 20:80 to 99:1.

The optical fiber cable of the present invention uses a resin composition as a covering resin that constitutes the outermost layer thereof, the resin composition containing: (a) a base resin prepared by adding at least one copolymer selected from an ethylene-vinyl acetate copolymer and an ethylene-ethyl acrylate copolymer to a high density polyethylene; (b) 25 to 90 parts by weight of a phosphate salt with respect to 100 parts by weight of the base resin; and (c) 0.75 to 15 parts by weight of either a silicone dispersed polyethylene or a silicone grafted polyethylene with respect to 100 parts by weight of the base resin.

In the optical fiber cable 10 shown in FIG. 1, the covering resins 6 and 9 and the neck portion 3 can be formed using the above-mentioned resin composition.

In the optical fiber cable 20 shown in FIG. 2, the covering resin 6 can be formed using the above-mentioned resin composition.

In the optical fiber cable 30 shown in FIG. 3, the outer layer 6A of the covering resin 6 can be formed using the above-mentioned resin composition.

(Base Resin)

In a base resin, the ratio of a high density polyethylene is preferably 30% by weight or more, and more preferably 30 to 90% by weight. By setting the ratio of a high density polyethylene within this range, the level of friction can be reduced while enhancing the abrasion resistance. When the above ratio is less than 30% by weight, the level of abrasion resistance required as an optical fiber cable may not be achieved.

Examples of the high density polyethylene used include a polyethylene produced by either a medium pressure process or a low pressure process and having a specific gravity of 0.93 to 0.97.

At least one of an ethylene-vinyl acetate copolymer and an ethylene-ethyl acrylate copolymer can be added to the high density polyethylene.

More specifically, it is desirable to use an ethylene-vinyl acetate copolymer (EVA) in which the content of vinyl acetate is from 6 to 35% by weight (and preferably from 15 to 22% by weight). In addition, an ethylene-ethyl acrylate copolymer in which the content of ethyl acrylate is from 7 to 30% by weight (and preferably from 15 to 25% by weight) is also suitable. Either one of the ethylene-vinyl acetate copolymer and ethylene-ethyl acrylate copolymer may be used or both of them may be used.

(Phosphate Salt)

Examples of the phosphate salts include metal salts of, for example, phosphoric acid, phosphorous acid and hypophosphorous acid, amine phosphate, melamine phosphate, dimelamine phosphate, melamine pyrophosphate, dimelamine pyrophosphate, ammonium polyphosphate, melamine polyphosphate, ethylenediamine phosphate and melamine nitrilotrisphosphonate. One of these phosphate salts may be used alone, or two or more thereof may be used in combination.

Examples of the commercially available products which can be suitably used include AP 750 (product name) manufactured by Clariant (Japan) K. K., FCP 730 (product name) manufactured by Suzuhiro Chemical Co., Ltd., BUDIT-3167 (product name) manufactured by Chemische Fabrik Budenheim, Leoguard 2000 (product name) manufactured by Shimadzu GLC Ltd., Hishiguard Select N-6ME (product name) manufactured by Nippon Chemical Industrial Co., Ltd., and Adeka Stubs FP2100 and FP2200 (product names) manufactured by Adeka Corporation.

The ratio of the phosphate salt added is 25 to 90 parts by weight, preferably 35 to 80 parts by weight, and more preferably 50 to 70 parts by weight, with respect to 100 parts by weight of the aforementioned base resin.

When the ratio is less than 25 parts by weight, a satisfactory level of flame resistance cannot be attained. On the other hand, when the ratio exceeds 90 parts by weight, although the flame resistance can be achieved, it is undesirable since the cold resistance deteriorates.

Compared to the cases where magnesium hydroxide or aluminum hydroxide is used, phosphate salts are capable of developing high flame resistance even when used in small amounts. This is possibly due to the following reasons.

When a high density polyethylene is used in the base resin, because of its high crystallinity, the amount of flame retardant added needs to be limited. As a result, an ethylene-vinyl acetate copolymer or an ethylene-ethyl acrylate copolymer which is highly amorphous is added as a flame retardant receptor.

In addition, regarding the flame retardant, when magnesium hydroxide or aluminum hydroxide is used, a required level of flame resistance is only achieved when added in large amounts. However, addition thereof in large amounts results in the deterioration of abrasion resistance and low frictional properties. On the other hand, because phosphate salts are highly effective than magnesium hydroxide or aluminum hydroxide in terms of flame resistance, an excellent level of flame resistance can be achieved even when used in small amounts.

Moreover, in addition to phosphate salts, addition of a nitrogen-containing flame retardant, such as melamine, melamine cyanurate and tris-(2-hydroxy-ethyl)-isocyanurate (THEIC), and a hydroxyl group-containing compound serving as an auxiliary agent, such as pentaerythritol and dipentaerythritol, in about 0.1 to 10 parts by weight, is also effective in further improving the flame resistance.

(Lubricant)

A silicone dispersed polyethylene or a silicone grafted polyethylene acts as a lubricant. The amount of this lubricant added is 0.75 to 15 parts by weight, preferably 0.75 to 10 parts by weight, and more preferably 1.0 to 8.0 parts by weight, with respect to 100 parts by weight of the base resin.

By making the added amount within this range, frictional properties required for the optical fiber cable can be improved. When the added amount exceeds 15 parts by weight, the flame resistance may deteriorate.

For the inner layer 6B in the optical fiber cable 30 shown in FIG. 3, a polyolefin-based resin (such as an ethylene-vinyl acetate copolymer and polyethylene) or the like can be used. For example, a resin prepared by adding 50 to 200 parts by weight of magnesium hydroxide to 100 parts by weight of a base resin composed of at least one copolymer selected from an ethylene-vinyl acetate copolymer and an ethylene-ethyl acrylate copolymer, can be used.

EXAMPLES

Next, the effects of the present invention will be described based on specific examples.

Example 1

The following tests were carried out on the respective properties by taking the actual applications into consideration. It should be noted that in the following explanation, "parts" refers to "parts by weight".
(1) Flame resistance: A 60° inclined combustion test specified in JIS C3005 was carried out, and the flame resistance was evaluated based on whether the sample material was self-extinguishing or not in this test.
(2) Cold resistance: In accordance with JIS K7216, the presence and absence of cracks at −15° C. was observed. It was evaluated as Good (G) when no crack was observed, whereas it was evaluated as Bad (B) when cracks were observed.
(3) Abrasion resistance: In accordance with the section regarding the abrasion resistance of a marking made on an optical fiber specified in JIS C6851, a polyvinyl chloride (PVC) metal cable having an outer covering made of polyvinyl chloride was attached to a steel needle portion shown in FIG. 4, and a abrasion test was carried out (i.e., reciprocations of 250 cycles with a load of 3 kg).
(4) Friction properties: A friction test specified in JIS K7125 was carried out, and the friction properties were evaluated based on whether the coefficient of dynamic friction of an outer covering (i.e., a covering resin) was 0.25 or less or not.

As follows is a more detailed description.
(1) Flame Resistance

In an optical fiber cable 20 shown in FIG. 2, a covering resin 6 was prepared using a resin composition having a composition shown in Table 1. The unit for the added amount is parts by weight (hereinafter, the same applies).

The optical fiber cable 20 had a minor axis (the vertical dimension in FIG. 2) of 1.6 mm and a major axis (the horizontal dimension in FIG. 2) of 2.0 mm.

As a base resin, a resin prepared by adding an ethylene-vinyl acetate copolymer to a high density polyethylene was used. As a high density polyethylene, Suntec HD B780 (product name) manufactured by Asahi Kasei Chemicals Corporation was used. As an ethylene-vinyl acetate copolymer, Evaflex V5274 (product name) manufactured by DuPont-Mitsui Polychemicals Co., Ltd. was used. As a phosphate salt, Terraju S-10 (product name) manufactured by Chemische Fabrik Budenheim (i.e., ammonium polyphosphate) was used. As a silicone dispersed polyethylene, HOM0C290 (product name) manufactured by Hexa Chemical Co., Ltd. was used. As magnesium hydroxide, Kisma 5E (product name) manufactured by Kyowa Chemical Industry Co., Ltd. was used.

The blend ratio, i.e., ethylene-vinyl acetate copolymer/high density polyethylene (mass ratio), was 30/70.

The results of the presence and absence of self-extinguishing properties of sample materials verified in the inclined combustion test specified in JIS C3005 are shown in Table 1. It was evaluated as Good (G) when the self-extinguishing properties were observed, whereas it was evaluated as Bad (B) when the fire spread.

Accordingly, it was confirmed that the flame resistance did not depend on the blend ratio, i.e., (high density polyethylene)/(ethylene-vinyl acetate copolymer), but depended on the blend ratio of a phosphate salt with respect to the base resin (i.e., high density polyethylene+ethylene-vinyl acetate copolymer), and self-extinguishing properties were observed when the amount of the phosphate salt was 25 parts or more with respect to 100 parts of the base resin (high density polyethylene+ethylene-vinyl acetate copolymer).

It should be noted that when a test was conducted under the same conditions except that 25 parts of magnesium hydroxide was added instead of a phosphate salt, no self-extinguishing properties were observed as a result.
(2) Cold Resistance In accordance with JIS K7216, the presence and absence of cracks in the covering resin 6 was observed at −15° C., a temperature to which an optical fiber cable may be subjected in the actual applications. It was evaluated as Good (G) when no crack was observed, whereas it was evaluated as Bad (B) when cracks were observed.

As a result of the test, it was verified that cracks were observed at −15° C. when the blend ratio of a phosphate salt was 100 parts or more.

From these results, it was confirmed that in order to achieve both of the flame resistance and the cold resistance, an adequate amount of phosphate salt to be added is 25 to 90 parts with respect to 100 parts of the base resin.

When taking the balance between the cold resistance and the flame resistance into consideration, the amount of phosphate salt added is more preferably 35 to 80 parts with respect to 100 parts of the base resin.

TABLE 1

| Ethylene-vinyl acetate | High density polyethylene | | | | | | | | | |
|---|---|---|---|---|---|---|---|---|---|---|
| copolymer | 100 | 100 | 100 | 100 | 100 | 100 | 100 | 100 | 100 | 100 |
| Phosphate salt | 12.5 | 25 | 35 | 45 | 50 | 70 | 80 | 90 | 100 | 0 |
| Magnesium hydroxide | 0 | 0 | 0 | 0 | 0 | 0 | 0 | 0 | 0 | 25 |
| Flame resistance | B | G | G | G | G | G | G | G | G | B |
| Cold resistance | G | G | G | G | G | G | G | G | B | G |

Table 2 shows the above-mentioned test results in much greater detail. In Table 2, regarding the flame resistance, in the inclined combustion test specified in JIS C3005, it was evaluated as Good (G) when the self-extinguishing properties were observed following the ignition with a flaming time of 10 seconds, it was evaluated as Very Good (VG) when the self-extinguishing properties were observed even after the sufficient ignition with a flaming time of 30 seconds, and it was evaluated as Bad (B) when the fire spread.

Regarding the cold resistance, in the cold resistance test specified in JIS K7216, it was evaluated as Good (G) when cracks were observed at −20° C. although no crack was observed at −15° C., and it was evaluated as Very Good (VG) when no crack was observed even at −20° C., whereas it was evaluated as Bad (B) when cracks were observed at −15° C.

TABLE 2

| Ethylene-vinyl acetate copolymer | 100 | 100 | 100 | 100 | 100 | 100 | 100 | 100 | 100 | 100 |
|---|---|---|---|---|---|---|---|---|---|---|
| | High density polyethylene | | | | | | | | | |
| Phosphate salt | 12.5 | 25 | 35 | 45 | 50 | 70 | 80 | 90 | 100 | 0 |
| Magnesium hydroxide | 0 | 0 | 0 | 0 | 0 | 0 | 0 | 0 | 0 | 25 |
| Flame resistance | B | G | VG | VG | VG | VG | VG | VG | VG | B |
| Cold resistance | VG | VG | VG | VG | VG | VG | VG | G | B | G |

(3) Abrasion Resistance 90 parts of a phosphate salt was added, which was the upper limit for the added amount thereof determined from the aforementioned results regarding the flame resistance, and abrasion properties were examined when the ratio of the high density polyethylene and the ethylene-vinyl acetate copolymer within the base resin was changed.

In the above-mentioned abrasion test (in accordance with JIS C6851), it was evaluated as Good (G) in those cases where no exposure of optical fibers, tension members or the like within an optical fiber cable was observed and also no exposure of conductors within a metal cable was observed, whereas it was evaluated as Bad (B) when any of such exposures were observed. The results are shown in Table 3.

From the results shown in Table 3, it was confirmed that a target level of abrasion properties can be achieved when the ratio of the high density polyethylene within the base resin was 30% by weight or more.

TABLE 3

| High density polyethylene | 10 | 20 | 25 | 30 | 60 | 90 |
|---|---|---|---|---|---|---|
| Ethylene-vinyl acetate copolymer | 90 | 80 | 75 | 70 | 40 | 10 |
| Phosphate salt | 90 | 90 | 90 | 90 | 90 | 90 |
| Abrasion properties | B | B | B | G | G | G |

(4) Friction Properties

In order to further reduce the coefficient of friction, a silicone dispersed polyethylene was added.

By taking the lower limit for the added ratio of high density polyethylene as well as the upper limit for the added amount of a filler within the base resin, which were obtained from the results of the above-mentioned tests regarding the flame resistance and abrasion properties, into consideration, a phosphate salt was added to a base resin (the added ratio of high density polyethylene/ethylene-vinyl acetate copolymer was 30 parts/70 parts), and a silicone dispersed polyethylene was then added to the resulting mixture.

The friction properties were evaluated in accordance with JIS K7125 by setting the target value for the coefficient of dynamic friction at 0.25 or less, and it was evaluated as Good (G) when the value was 0.25 or less, whereas it was evaluated as Bad (B) when the value was greater than 0.25. The result is shown in Table 4.

From the results shown in Table 4, it was confirmed that the coefficient of dynamic friction achieved a target value when the added amount of a silicone dispersed polyethylene was set to 0.75 parts or more.

TABLE 4

| High density polyethylene | 30 | 30 | 30 | 30 | 30 | 30 | 30 | 30 | 30 | 30 |
|---|---|---|---|---|---|---|---|---|---|---|
| Ethylene-vinyl acetate copolymer | 70 | 70 | 70 | 70 | 70 | 70 | 70 | 70 | 70 | 70 |
| Phosphate salt | 80 | 80 | 80 | 80 | 80 | 80 | 80 | 80 | 80 | 80 |
| Silicone dispersed polyethylene | 0.25 | 0.5 | 0.75 | 1 | 2 | 3 | 4 | 10 | 15 | 20 |
| Coefficient of friction | B | B | G | G | G | G | G | G | G | G |
| Flame resistance | G | G | G | G | G | G | G | G | G | B |

Table 5 shows the above-mentioned test results in much greater detail. In Table 5, regarding the friction properties, in the test specified in JIS K7125, it was evaluated as Very Good (VG) when the coefficient of friction was 0.20 or less, it was evaluated as Good (G) when the coefficient of friction exceeded 0.20 but was no greater than 0.25, and it was evaluated as Bad (B) when the coefficient of friction was greater than 0.25.

Regarding the flame resistance, in the inclined combustion test specified in JIS C3005, it was evaluated as Good (G) when the self-extinguishing properties were observed following the ignition with a flaming time of 10 seconds, it was evaluated as Very Good (VG) when the self-extinguishing properties were observed even after the sufficient ignition with a flaming time of 30 seconds, and it was evaluated as Bad (B) when the fire spread.

TABLE 5

| High density polyethylene | 30 | 30 | 30 | 30 | 30 | 30 | 30 | 30 | 30 | 30 |
|---|---|---|---|---|---|---|---|---|---|---|
| Ethylene-vinyl acetate copolymer | 70 | 70 | 70 | 70 | 70 | 70 | 70 | 70 | 70 | 70 |
| Phosphate salt | 80 | 80 | 80 | 80 | 80 | 80 | 80 | 80 | 80 | 80 |
| Silicone dispersed | 0.25 | 0.5 | 0.75 | 1 | 2 | 3 | 4 | 10 | 15 | 20 |

TABLE 5-continued

| High density polyethylene | 30 | 30 | 30 | 30 | 30 | 30 | 30 | 30 | 30 | 30 |
|---|---|---|---|---|---|---|---|---|---|---|
| polyethylene | | | | | | | | | | |
| Coefficient of friction | B | B | G | VG | VG | VG | VG | VG | VG | VG |
| Flame resistance | VG | VG | VG | VG | VG | VG | VG | G | G | B |

Example 2

An optical fiber cable was prepared in the same manner as that described in Example 1 except that instead of using the ethylene-vinyl acetate copolymer, the same amount of an ethylene-ethyl acrylate copolymer was used, and the obtained optical fiber cable was subjected to the same tests as those described in Example 1. As a result, as in Example 1, it was confirmed that all the flame resistance, friction properties and abrasion properties achieved favorable levels.

As an ethylene-ethyl acrylate copolymer, Evaflex EEA A-704 (product name) manufactured by DuPont-Mitsui Polychemicals Co., Ltd. was used.

Example 3

An optical fiber cable was prepared in the same manner as that described in Example 1 except that instead of using a silicone dispersed polyethylene, the same amount of a silicone grafted polyethylene was used, and the obtained optical fiber cable was subjected to the same tests as those described in Example 1. As a result, when 0.75 to 15 parts of a silicone grafted polyethylene were used, as in Example 1, it was confirmed that all the flame resistance, friction properties and abrasion properties achieved favorable levels.

As a silicone grafted polyethylene, SP-110 (product name) manufactured by Dow Corning Toray Co., Ltd. was used.

Example 4

In the optical fiber cable 30 shown in FIG. 3, a resin composition prepared by adding magnesium hydroxide as a flame retardant to an ethylene-vinyl acetate copolymer was used for the inner layer 6B, whereas the same resin composition as that used in Example 1 was used for the outer layer 6A, and the flame resistance, abrasion properties, Motion properties and cold resistance were evaluated. As a result, as in Example 1, it was confirmed that all the properties achieved favorable levels.

The obtained results are summarized as follows.

All the properties, i.e., the flame resistance, friction properties and abrasion properties, achieved favorable levels when 25 to 80 parts of a phosphate salt and 0.75 to 15 parts of either a silicone dispersed polyethylene or a silicone grafted polyethylene were added to 100 parts of a base resin which was prepared by adding at least one kind of resin selected from an ethylene-vinyl acetate copolymer and an ethylene-ethyl acrylate copolymer to a high density polyethylene.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

According to the present invention, by using the above-mentioned resin composition, the levels of abrasion resistance, friction properties, and cold resistance become favorable without reducing the level of flame resistance. Therefore, it can be suitably used for an optical fiber cable that is used for the fiber to the home (FTTH) services and the like.

What is claimed is:

1. An optical fiber cable for a wiring in premises, comprising:
    a covering resin comprising an outermost layer, wherein the outermost layer is formed by a resin composition comprising:
        a base resin prepared by adding an ethylene-vinyl acetate copolymer to a high density polyethylene;
        25 to 90 parts by weight of a polyphosphate salt with respect to 100 parts by weight of the base resin;
        0.75 to 15 parts by weight of a silicone dispersed polyethylene with respect to 100 parts by weight of the base resin; and
        a mass ratio of the high density polyethylene and the ethylene-vinyl acetate copolymer is between 30/70 to 90/10; and
    a cable body portion comprising an optical fiber embedded in the cable body portion and tensile-strength bodies arranged at both sides of the optical fiber, wherein:
        the optical fiber and the tensile-strength bodies are collectively covered by the covering resin; and
        the optical fiber is exposable by dividing the covering resin at notches formed on an outer surface thereof.

2. The optical fiber cable for a wiring in premises according to claim 1, wherein the resin composition comprises 35 to 80 parts by weight of the polyphosphate salt with respect to 100 parts by weight of the base resin.

3. The optical fiber cable for a wiring in premises according to claim 2, wherein the polyphosphate salt is an ammonium polyphosphate.

4. The optical fiber cable for a wiring in premises according to claim 1, wherein the resin composition comprises 1 to 4 parts by weight of the silicone dispersed polyethylene with respect to 100 parts by weight of the base resin.

5. The optical fiber cable for a wiring in premises according to claim 4, wherein the polyphosphate salt is an ammonium polyphosphate.

6. The optical fiber cable for a wiring in premises according to claim 2, wherein the resin composition comprises 1 to 4 parts by weight of the silicone dispersed polyethylene with respect to 100 parts by weight of the base resin.

7. The optical fiber cable for a wiring in premises according to claim 6, wherein the polyphosphate salt is an ammonium polyphosphate.

8. The optical fiber cable for a wiring in premises according to claim 1, wherein the polyphosphate salt is an ammonium polyphosphate.

* * * * *